US010875483B2

(12) United States Patent
De Silva et al.

(10) Patent No.: US 10,875,483 B2
(45) Date of Patent: Dec. 29, 2020

(54) AUTOMATIC DETECTION AND ASSESSMENT OF LOW-SPEED CRASHES

(71) Applicant: Bayerische Motoren Werke Aktiengesellschaft, Munich (DE)

(72) Inventors: Angelo De Silva, Munich (DE); Johannes Malotta, Buch am Erlbach (DE); Wolfgang Hundt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 341 days.

(21) Appl. No.: 15/865,603

(22) Filed: Jan. 9, 2018

(65) Prior Publication Data

US 2018/0126937 A1 May 10, 2018

Related U.S. Application Data

(63) Continuation of application No. PCT/EP2016/066221, filed on Jul. 8, 2016.

(30) Foreign Application Priority Data

Jul. 10, 2015 (DE) .................. 10 2015 212 923

(51) Int. Cl.
*B60R 21/0136* (2006.01)
*G07C 5/08* (2006.01)
(Continued)

(52) U.S. Cl.
CPC ...... *B60R 21/0136* (2013.01); *B60R 21/0132* (2013.01); *B60R 21/01336* (2014.12);
(Continued)

(58) Field of Classification Search
CPC ............ B60R 21/0136; B60R 21/0132; B60R 21/01338; B60R 21/01336;
(Continued)

(56) References Cited

U.S. PATENT DOCUMENTS 5,229,943 A 7/1993 Eigler et al.
5,608,628 A 3/1997 Drexler et al.
(Continued)

FOREIGN PATENT DOCUMENTS

DE 41 17 811 A1 12/1992
DE 102 06 351 A1 9/2003
(Continued)

OTHER PUBLICATIONS

International Search Report (PCT/ISA/210) issued in PCT Application No. PCT/EP2016/066221 dated Oct. 7, 2016 with English translation (Six (6) pages).
(Continued)

*Primary Examiner* — Alan D Hutchinson
(74) *Attorney, Agent, or Firm* — Crowell & Moring LLP

(57) ABSTRACT

In order to detect a vehicle accident in which a vehicle and an object crash into one another, wherein a motion variable assigned to the collision is so low that at least one active occupant protection system provided for accidents in the vehicle is not activated by the crash, it is provided, with respect to the collision event, that signals and/or data formed by sensors of the vehicle are processed in such a manner that the signals and/or data are filtered, feature data are formed based on the filtered signals and/or data, and the collision event is assigned to a classification in a classification database based on the feature data.

20 Claims, 5 Drawing Sheets

(51) Int. Cl.
  *B60R 21/0132* (2006.01)
  *G06F 16/28* (2019.01)
  *G06F 16/22* (2019.01)

(52) U.S. Cl.
  CPC .... *B60R 21/01338* (2014.12); *G06F 16/2237* (2019.01); *G06F 16/2246* (2019.01); *G06F 16/285* (2019.01); *G07C 5/085* (2013.01); *G07C 5/0808* (2013.01); *B60R 2021/01322* (2013.01)

(58) Field of Classification Search
  CPC ....... B60R 2021/01322; G06F 16/2246; G06F 16/2237; G06F 16/285; G07C 5/085; G07C 5/0808
  See application file for complete search history.

(56) References Cited

U.S. PATENT DOCUMENTS

| | | | |
|---|---|---|---|
| 5,684,701 A | 11/1997 | Breed | |
| 7,113,079 B2 | 9/2006 | Singh et al. | |
| 2010/0305818 A1* | 12/2010 | Doerr | B60R 21/013 |
| | | | 701/46 |
| 2011/0190989 A1* | 8/2011 | Feser | B60R 21/0132 |
| | | | 701/46 |
| 2015/0091718 A1* | 4/2015 | Niemann | G07C 5/0833 |
| | | | 340/436 |
| 2016/0257203 A1* | 9/2016 | Thoemmes | B60L 53/12 |

FOREIGN PATENT DOCUMENTS

| | | |
|---|---|---|
| DE | 10 2006 049 262 A1 | 4/2008 |
| DE | 10 2007 027 649 A1 | 12/2008 |
| DE | 10 2008 003 081 A1 | 7/2009 |
| DE | 10 2014 013 472 A1 | 4/2015 |
| EP | 2 854 112 A1 | 4/2015 |
| WO | WO 90/11207 A1 | 10/1990 |

OTHER PUBLICATIONS

German-language Written Opinion (PCT/ISA/237) issued in PCT Application No. PCT/EP2016/066221 dated Oct. 7, 2016 (Six (6) pages).

German-language Search Report issued in counterpart German Application No. 10 2015 212 923.3 dated Dec. 8, 2015 with partial English translation (Thirteen (13) pages).

* cited by examiner

AUTOMATIC DETECTION AND ASSESSMENT OF LOW-SPEED CRASHES

CROSS REFERENCE TO RELATED APPLICATIONS

This application is a continuation of PCT International Application No. PCT/EP2016/066221, filed Jul. 8, 2016, which claims priority under 35 U.S.C. § 119 from German Patent Application No. 10 2015 212 923.3, filed Jul. 10, 2015, the entire disclosures of which are herein expressly incorporated by reference.

BACKGROUND AND SUMMARY OF THE INVENTION

The present invention relates to a method, a system and a computer program product for the automatic detection and assessment of low-speed crashes. In particular, the present invention relates to the detection of vehicle accidents at a relatively low speed, wherein an assessment of the accident, in particular for determining the damage to a vehicle which has occurred during said accident can also be carried out. The present invention also relates to a correspondingly equipped vehicle.

Nowadays, a large number of sensors, with which accident events can be detected in order to be able to trigger, under certain circumstances, active or passive protection systems such as airbags, seat belt pretensioners, emergency call systems etc. automatically, are installed in motor vehicles. The corresponding detection systems are, however, as a rule configured in such a way that they only detect accidents starting from a predefined lower detection threshold, such as starting from a certain minimum speed of the vehicle and/or a minimum acceleration.

DE 41 17 811 A1 discloses, for example, a method for detecting crashes in which the vehicle speed is measured and assessed continuously with respect to the change within a preceding, limited time period as what is referred to as a partial speed difference. In this context, it is also possible to form acceleration values and assess them by means of threshold values, in order to be able to differentiate high-speed crashes from low-speed crashes.

DE 10 2007 027 649 A1 proposes a control unit and a method for actuating personal protection means with which a feature vector is formed with at least two features from at least one signal in an accident sensor system. The feature vector is classified by a support vector machine (SVM).

DE 10 2008 003 081 A1 has described a method and a device for crash classification for a vehicle safety system, in which a currently determined driving situation is classified on the basis of a machine learning process to determine whether a personal protection means is to be activated. For this purpose, crash classes are defined by predefined crash features.

EP 2 854 112 A1 discloses a detection system for detecting accidents at low speeds or in the case of a relatively low impact, in which acceleration values which are acquired along a plurality of axes are each filtered by means of bandpass filters, and the filtered values are used to determine the severity of the impact.

WO 90/11207 A1 has described a controller for vehicle occupant restraint systems or protection systems for vehicles in which signals of an acceleration sensor are subject to a plurality of different evaluations, wherein in each case the profile is evaluated according to different criteria and with a plurality of differently defined threshold values. Two different types of accident such as, for example, head-on and oblique, can be differentiated from one another on the basis of the time profile and the respective threshold value. Differently defined profiles or threshold values for the severity of the accident can also be provided.

U.S. Pat. No. 5,684,701 A has described a sensor system for detecting accidents and for triggering vehicle occupant protection systems in vehicles, in which the sensor signals are evaluated by means of self-learning methods on the basis of artificial neural networks. In this context, sensor data from accidents, which has been acquired in artificially brought-about crash tests, is used for learning a sensor algorithm, and corresponding sensor data which does not originate from accidents.

U.S. Pat. No. 7,113,079 B2 discloses a method and a system for detecting vehicle collisions in which a Hidden Markov Model (HMM) is used to assess sensor parameters.

The contents of the above-mentioned publications are herewith incorporated into the present description by reference.

As already mentioned, the systems mentioned at the beginning are configured to activate active vehicle occupant protection systems. In contrast, it would also be desirable for a vehicle to be able to autonomously detect accident events, for the purpose of detecting damage, even when a collision takes place at a relatively low speed, with a relatively weak external effect (impact energy) and/or with relatively low acceleration values. Such events can occur, in particular, during parking processes as what are referred to as parking prangs.

An object of the present invention is to make a contribution to detecting as reliably as possible a collision between a vehicle and an object, in which a movement variable of the impact is relatively low.

This object is achieved by means of the invention which is specified in the independent patent claims. Advantageous embodiments of the invention are specified in the dependent claims.

According to the invention, there is provision for detecting a vehicle accident, in which a vehicle and an object impact against one another, and in which a movement variable of the impact is so low that at least one active vehicle occupant protection system, provided for accidents, of the vehicle is not activated, that at the impact event signals and/or data formed by means of sensors of the vehicle are processed in such a way that the signals and/or data are filtered, feature data is formed on the basis of the filtered signals and/or data, and an assignment of the impact event to a classification is carried out by means of the feature data, wherein a classification database is used.

For the purpose of assignment, in particular at least one classification method can also be used. The classification method can comprise, in particular, at least one classification rule.

The movement variable is, in particular, a variable which is relevant for the activation of the active vehicle occupant protection system of the vehicle. Said movement variable is, in particular, a variable which is used for controlling the activation and is also, in particular, essential.

In particular, the impact speed, the change in speed (acceleration) and/or the change in acceleration of the vehicle (or of a sensor provided in the vehicle) which are/is associated with the impact and which is, in particular, a maximum and/or average change and/or an energy variable which is assigned to the impact, in particular impact energy, can be provided as the movement variable. Said variable can also be a variable which is derived from one or more of the abovementioned variables. The impact speed can be, in particular, the relative speed between the vehicle and the object at the start of the impact, the actual speed of the vehicle or the actual speed of the object, in particular when the vehicle is stationary.

By using the sensors it is possible to form sensor signals or data relating to the movement variable, for example relating to the velocity of the vehicle, relating to accelerations in one or more different directions, e.g., to a longitudinal acceleration and/or a transverse acceleration of the vehicle. When a unidimensional movement variable is detected in one direction there can be provision, in particular, that longitudinal oscillations which occur along the axis of the one direction are not detected but instead only the movement variable relating to the one direction.

The sensors can comprise at least one microphone, one camera, one ultrasonic sensor, one radar sensor, one lidar sensor and/or one pressure sensor or force sensor. By means of a respective sensor, in particular a movement variable can be detected in one direction and/or derived from the respective sensor signals. The sensor, in particular a corresponding pressure sensor or the signals thereof can be used twice here, specifically for detecting a low speed crash and for actuating the active vehicle occupant protection system. A pressure sensor is suitable, in particular, for detecting a unidimensional movement variable in a direction such that oscillations which occur along the axis of the one direction are not detected. In contrast, in particular a microphone (or sound sensor) is suitable for detecting corresponding oscillations (or soundwaves).

An impact strength-determining module can include a crash severity determining unit which determines and outputs a value of the severity of the impact on the basis of predefined rules. Said impact strength-determining module can also include a crash direction-determining unit which determines a value of the direction of the impact with respect to vehicle axes on the basis of predefined rules and outputs said value. It is also possible that said impact strength-determining module can also comprise a crash location-determining unit which determines the location of the impact on the vehicle on the basis of predefined rules.

The invention is based on the realization that the classification of impact events between a vehicle and an object in the low speed range with respect to the occurrence of an accident in which the vehicle is damaged by the effect of the foreign object, and another uncritical event such as traveling over a pothole or full braking, referred to as a misuse event, constitutes a difficult technical problem, since events of these two event classes are very similar, or cannot be differentiated unambiguously, given the customary signals which are output by vehicle sensors (e.g., by acceleration sensors) and are used, for example, to trigger vehicle occupant protection systems or automatic emergency call devices such as what is referred to as the ecall system, which is provided for introduction in Europe. The invention is based, in particular, on the realization that the application of the above-mentioned accident detection systems at relatively high speeds with predominantly acceleration-threshold-value-based methods are not sufficient for detecting less serious accidents at low relative speeds between the vehicle and the colliding object, since the differentiation of damage events in comparison with non-invasive misuse events is therefore carried only in a relatively unreliable way.

Within the scope of the invention, in particular a configurable signal-processing system can be specified for vehicle-autonomous, automatic detection of accidents with a relatively low movement variable (referred to as low-speed crashes). This system can be provided as a real time system. In particular, relatively low computation complexity can be provided for this during the data processing.

With the invention it has been recognized that by selective filtering of the respective signals or data items, by forming feature data which is assigned to the impact event and which represents a predefined feature of the impact event, in particular from a plurality of sensor signals or data items, and by processing the feature data and, in particular, by using a classification method, it is possible to carry out the assignment of the impact event to a classification, in particular to the two classification stages of "misuse event" and "low speed crash" with a higher level of accuracy than with conventional methods.

In advantageous embodiments of the invention, feature data is formed from the signals or data which are output by a plurality of sensors. In this context, vector data can be formed with respect to an impact event, in particular from a plurality of feature data items, and furthermore, in particular, what are referred to as feature vectors can be formed, which represent an, in particular multi-dimensional, observation variable relating to the impact event.

The vehicle sensors can include, in particular, sensors which are not provided primarily or not provided directly, and in particular not provided for the purpose of detecting accident data, and in particular not for controlling the triggering of an active vehicle occupant protection system. According to the invention it has been realized that at least partial features for accident detection can be derived and/or computed implicitly from signals and/or data which has been detected, generated and/or output by such sensors. Examples of such sensors are microphones for picking up sound, cameras for capturing images, ultrasonic sensors, radar sensors, lidar sensors or pressure sensors or force sensors.

With the invention it is possible to achieve, in particular, the advantage that the detection of low speed crashes can take place using sensors which are already present in a vehicle, i.e., the sensor signals of which are used in the vehicle for at least one further function which is independent of the low speed crash detection. No additional or separate sensor for the vehicle, and in particular no separate solid-borne sound sensor, is then necessary for the low speed crash detection. The low speed crash detection can then be supported, in particular, exclusively on signals which are already used elsewhere in the vehicle.

The signals and/or data formed by means of the vehicle sensors and transmitted, in particular, via an asynchronous communication bus can advantageously be synchronized with one another for the purpose of filtering, and in particular before the filtering. This can take place, for example, by means of a uniform system time provided in the vehicle and, in particular, over a predefined group of electrical control units, and/or by means of time stamps. In the course of the filtering of the signals and/or data formed by means of the sensors, selection signals and/or selection data predetermined by means of predefined time window data can be selected and/or derived from the signals and/or data formed previously by means of the sensors.

With the invention it is advantageously possible to carry out automatic, vehicle autonomous detection of an accident event at a relatively low speed or with a relatively weak external effect. In particular, with the invention it is possible to make available a system and a method for vehicle autonomous, automatic detection and/or evaluation of low speed crashes and/or low impact crashes or of vehicle collisions with a low speed crash characteristic.

The invention can be used independently of whether the vehicle is moving and impacts against a stationary obstacle or touches said obstacle or whether the vehicle is stationary and is impacted or touched, e.g., by another vehicle. Such events can occur, in particular, during parking prangs. With the invention it is possible to detect such an event, store the corresponding data in the vehicle for documentation purposes and/or transmit said data to a vehicle external memory. As a result, a low speed crash event can advantageously be documented for proof purposes, such as for cars for hire or rental vehicles, if appropriate with additional detection and documentation of the associated time and location.

On the basis of the information about a detected low speed crash event it is advantageously possible also to actuate selectively other control systems of the vehicle, for example a pedestrian accident protection system with corresponding protection means for a pedestrian detected by the vehicle at low speed.

Within the scope of the invention it is possible to provide that the corresponding vehicle sensors and/or at least one control unit which is involved in the detection of the accident is/are active independently of whether the ignition of the vehicle is switched on. In particular it is possible to provide that a control unit has a bus wake up device which wakes up the vehicle databus and/or specific sensors from a sleeping state in order to carry out the accident detection. The wake-up device can have, in particular, at least one sensor for directly and/or indirectly detecting a movement variable of the vehicle and a corresponding vehicle bus interface. As a result, in particular automatic, vehicle autonomous accident detection can be carried out, for example, when the vehicle is parked.

With the invention it is also advantageously possible to ensure that sensors, control devices and/or data connections, in particular databuses, which are usually already provided, in particular installed, in vehicles, can be used without a relatively large degree of modification and, in particular, without substantial technical hardware changes in order to implement a method according to the invention. The invention can therefore be implemented, in particular, by purely technical program, software related adaptation of corresponding vehicle components. For this purpose, it is possible that in individual vehicle components only one non volatile and/or one volatile memory has to be expanded in order to store additional control program code and/or that additional control program code or software components are provided, individual interfaces expanded or added to and/or other adaptations of this kind are performed. A corresponding vehicle component, in particular an electronic control device, is to be equipped with corresponding resources including corresponding computing power, in order to implement the invention, wherein no particularly large demands have to be made with respect to the computing power, since the processing of data does not necessarily have to be carried out in real time for low speed crash detection, in contrast to the situation in systems which activate vehicle occupant protection systems when relatively large impact related movement variables, in particular speeds and/or accelerations, occur.

The vehicle sensors are preferably provided on and/or in the vehicle. The object can be, e.g., another stationary object or moving object, in particular a second vehicle, a pedestrian or an obstacle such as a fence or a tree.

According to an advantageous exemplary embodiment of the invention, the at least one classification method and/or the classification database is formed by means of a machine learning (ML) method, in particular by means of a method based on an artificial neural network (ANN), a support vector machine (SVM), a Hidden Markov Model (HMM) or a decision tree.

Within the scope of the machine learning method, a database is generated, in particular, by means of what are referred to as training data sets. The training data sets can be made available and/or acquired, in particular, by means of data recordings and/or records of predefined, known accident events and/or on the basis of the execution and corresponding data recording of, in particular representative, driving trials.

In this context, on the basis of the sensor data which are formed and, in particular, recorded during the events or driving trials and/or of further data of the vehicle (input data) which is generated in the vehicle and made available, in particular, via a vehicle databus (vehicle communication bus), and the classification assignment, known in the process, of the respective events relating to a low speed crash event versus a misuse event (output data) corresponding input samples can be trained and the data of the database can be generated.

The detection accuracy of a system which executes the method according to the invention can be optimized and improved iteratively according to one advantageous exemplary embodiment, wherein, in particular, successive system variations can be carried out with respect to parameterization and implementation, for example with respect to used input signals, of computed, in particular derived and/or extracted, features or feature vectors and/or algorithms which are formed therefrom for the purpose of data processing or signal processing, etc. In particular on this basis it is possible to iteratively evaluate system events and/or system performance data and, under certain circumstances, train the system again, wherein cross validations can also be carried out. In particular on this basis it is possible to postulate in an iteratively analytical fashion system models and/or hypotheses for optimization and/or carry out planned system variations, which can then in turn lead to new parameterization and/or implementation.

Within the scope of the invention it is also advantageously possible to determine damage occurring to a vehicle after an accident, wherein, in particular, the method steps which are described in this document can be carried out for the detection of a low speed crash, and furthermore the steps according to which further accident data, by means of which a scope of damage is determined, in particular estimated, is determined by means of the assignment of the impact event which has been made. For this purpose, for example data relating to the estimation of the impact direction, the impact location on the vehicle and/or the impact severity (impact energy, impact speed or further dimensions associated with the impact, distances, speeds, changes in speed and/or changes in acceleration etc.) are detected, for example by means of sensors of the vehicle such as at least one speed sensor, acceleration sensor, distance sensor and/or a camera.

According to one further advantageous exemplary embodiment of the invention, the data formed by means of the sensors of the vehicle, data derived therefrom, and/or further data formed by control units of the vehicle is transmitted via a databus of the vehicle. The transmission is carried out, in particular, between sensor assemblies and/or controllers and/or by sensor assemblies via, if appropriate, directly connected controllers via the respectively connected databus or buses to a respective control unit which entirely or partially implements a method according to the invention or entirely or partially comprises a system according to the invention. In this context, received data can be processed by an evaluation apparatus in order to bring about at least some of the method steps according to the invention.

In conjunction with the present description, in principle any type of electronic databus can be used as a databus, in particular a customary databus in the field of automobiles, such as a local interconnect network (LIN) databus, a controller area network (CAN) databus, an Ethernet databus, a Flexray databus or a media oriented systems transport (MOST) databus can be used. The data transmission between a sensor and the evaluation device can occur even over a plurality of databuses, i.e., via a databus system, which comprises, in particular, a plurality of identical or similar or different databuses.

The invention can be carried out, in particular, as a method. It can also be specified in the form of a system for detecting a vehicle accident, in which a vehicle and an object impact against one another, wherein a movement variable is so low that at least one active vehicle occupant protection system, provided for accidents, of the vehicle is not activated, wherein the system comprises:
a) sensors which are provided for the vehicle and form signals and/or data relating to the impact event, and
b) a data-processing device, which comprises a classification data base, designed to process the signals and/or data in such a way that
b1) the signals and/or data are filtered,
b2) feature data is formed on the basis of the filtered signals and/or data, and
b3) an assignment of the impact event to a classification is carried out by means of the feature data, wherein the classification database is used.

The signals or data can be generated, made available and/or transmitted, in particular, in the form of messages. The assignment can be made, in particular, by means of at least one classification method. The classification method can comprise at least one classification rule.

The system can have further features, in particular components, which are configured to bring about method steps which are described in this document in conjunction with method steps according to the invention.

The system can in particular be provided for implementation on an electronic control unit (ECU) which is installed in a motor vehicle and which provides access to at least one vehicle communication bus system (CAN, Flexray etc.).

The system has, in particular, a reading access to the connected communication bus at its input interface. In this context, there can be a selection of or restriction to message types which include signals and/or data relevant for the feature computation. If the respective signals, data and/or messages required for the processing are encoded, corresponding information on the decoding thereof is required, stored and/or made available in the system.

On the output side, the system has, in particular, a writing access to the communication bus. A separate message type can preferably also be provided with which the detection result, in particular relating to the running time, is output at regular time intervals in the form of a corresponding message to the communication bus. In this context, it is advantageous to output a corresponding message, e.g., of the type "low speed crash detected" only in the case of a positively detected corresponding accident event. Therefore, it is possible, for example, for arbitrary systems which also have access to the communication process to use the message which is output by a system according to the invention via a detected low speed crash for their respective application purposes, to process it further and/or pass it on to connected downstream systems. For example, it would be conceivable to output the message relating to the detection result on a graphic user interface (Human Machine Interface, HMI), for the vehicle driver by means of a screen provided in the vehicle. The message and, if appropriate, further data detected in the vehicle before, during or after the impact event can be transmitted to vehicle internal and/or vehicle external devices fully automatically or initiated, for example, by an operator command by the vehicle driver. The data can be transmitted, for example, to a mobile radio device such as a smartphone and/or to what is referred to as a backend server which is configured to exchange data with a multiplicity of predefined vehicle data items. In a backend server it is possible for what are referred to as telematics services to be made available for vehicles, in which information and/or data is detected, processed, stored, made available and/or passed on, for and in particular by a vehicle. Components or functions of a vehicle can also be remote controlled by means of a telematics service.

Furthermore, the system can have a system data interface via which system configurations can be performed and/or information relating to the current system status can be interrogated. The system data interface can be connected via a vehicle internal communication bus and/or can comprise external interface components which are independent of communication buses of the vehicle.

With the invention it is also possible to specify a vehicle which comprises a system according to the invention, as well as a computer program which brings about method steps according to the invention when it is loaded and run on a computer.

Other objects, advantages and novel features of the present invention will become apparent from the following detailed description of one or more preferred embodiments when considered in conjunction with the accompanying drawings.

BRIEF DESCRIPTION OF THE DRAWINGS

In the text which follows, further exemplary embodiments of the invention will be explained in more detail with reference to the figures. In so far as identical, identically acting or similar elements are shown in the figures, they can be provided with the same reference signs in all the figures. In the drawings.

DETAILED DESCRIPTION OF THE DRAWINGS

Figure 1:
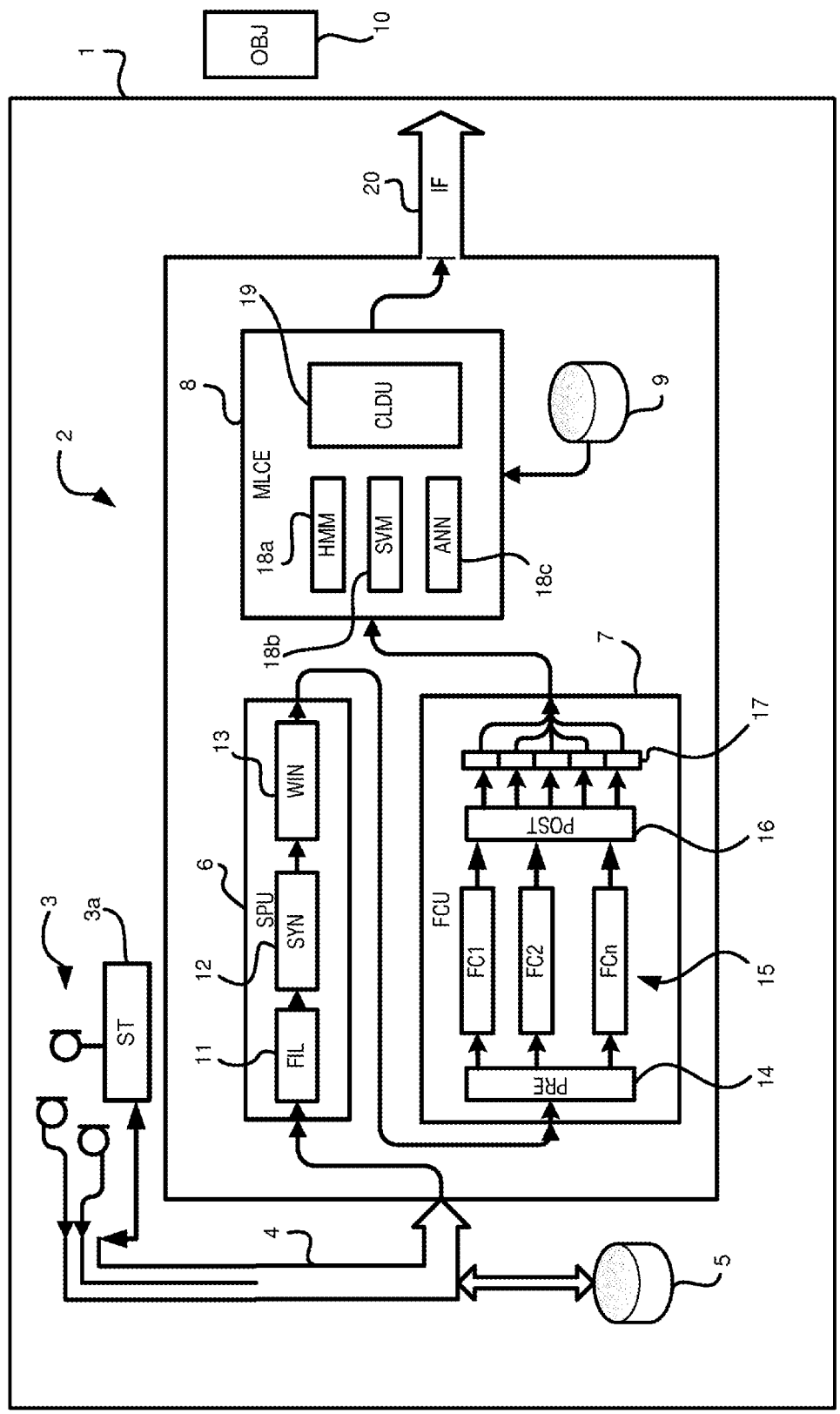
FIG. 1 shows a vehicle having a system for detecting low speed crash events and process steps which are executed therewith.

A vehicle 1, which is illustrated merely symbolically in FIG. 1, comprises a detection system 2 for detecting low speed crash events on the vehicle 1 caused, for example, by an impact of a schematically shown object 10 with the vehicle 1, at a relatively low relative speed between the vehicle 1 and the object 10. Furthermore, FIG. 1 shows schematically various sensors 3 located in the vehicle 1, a control unit (electronic control unit, ECU) 3a, and a controller area network (CAN) databus 4 of the vehicle 1 through which signals and/or data can be exchanged between the sensors 3 and/or via electronic control devices 3a of the vehicle 1. Corresponding sensor signals or data relating to measurement variables, for example relating to the velocity of the vehicle 1, to accelerations in various directions (longitudinal/transverse acceleration) etc. are formed by the sensors 3. The respective data or signals formed by the sensors 3 are packaged into corresponding databus messages, if appropriate via directly connected, in particular wired, control devices in, if appropriate, prefiltered and/or unfiltered and, in particular, encoded form and are made available via the CAN databus 4 of the vehicle 1. They can be read out online, in particular in real time, by the detection system 2 which is also connected to the CAN databus 4 and implemented, in particular, on a dedicated control device, and/or can be read out offline, in particular for training purposes, from a trace memory 5 of the vehicle 1 and/or from an externally connected, corresponding trace database. In the case of a trace memory which is optionally located on the vehicle 1, all data or messages, or selected data or messages, which are output via the CAN databus 4 during ongoing operation are stored for a respectively predefined time period, and they can therefore be used, e.g., for later training purposes and/or analysis purposes. The trace database is a database in which corresponding bus messages are stored in the form of what are referred to as log traces which have been recorded in advance, as a rule using corresponding data loggers, e.g., during the execution of corresponding driving trials or crash trials and/or under real accident conditions. In this context, the respective data can, if appropriate, additionally already be stored preprocessed in an advantageous form for a training process which is used by the detection system and is based on machine learning (ML).

The detection system 2 comprises a signal pre-processing unit 6 (SPU), a feature computation unit 7 (FCU), a classification unit 8, which operates on the basis of a machine learning process (Machine Learning Classification Engine, MLCE), and a classification database 9, which contains data which is generated and/or used in a machine learning process.

In order to detect a vehicle accident or an impact event of an object 10 connected thereto with the vehicle 1 with a low movement variable such as low impact speed or low change in speed or change in acceleration associated with the impact (low speed crash event), the signals and/or data formed by the sensors 3 of the vehicle 1 are processed in the signal pre-processing unit 6 by means of predefined rules in such a way that they are at least selectively filtered.

The impact speed is, in particular, the relative speed between the object and the vehicle, for example a relative speed of higher than 0 and less than or equal to 20 km/h before the impact. However, a speed difference, associated with the impact, of the vehicle with respect to the initial speed of said vehicle can also be used as the impact speed. The respective speed values can be related, in particular, to a time which is predefined with respect to the impact event, for example 300 ms before the time at which the acceleration maximum which is associated with the impact occurs. A profile of the corresponding speed variables or acceleration variables can also be used as the movement variable.

The selectively filtered signals and/or data generated in the signal pre-processing unit 6 are subsequently output to a feature computation unit 7. In the feature computation unit 7 feature data is formed on the basis of the previously selectively filtered signals and/or data by means of predefined rules. The feature data represents here, in particular, an observation variable for the impact event. In this context, a multiplicity of feature data items and, in particular, multi-dimensional feature vectors can be formed by means of predefined rules, from a multiplicity of sensor signals or sensor data items which have been formed by a sensor and/or by a plurality of sensors before, during or after the impact event.

The signal pre-processing unit 6 ensures, in particular, the filtering of relevant signals or data from the message traffic running via the communication bus (CAN databus 4) connected to the input of said signal pre-processing unit 6, and the conversion thereof into a suitable form, in order to prepare them for the process of forming feature data which is to be carried out subsequently.

The feature data formed in the feature computation unit 7, in particular feature vectors and/or data derived therefrom are output as observation data, in particular as multi-dimensional observation vector data by the feature computation unit 7 to the classification unit 8. The feature data is processed in the classification unit 8 by means of at least one classification method and using the classification database 9 in such a way that an assignment of the impact event on which the signals or data or the feature data derived therefrom are based to an event class of the classification is achieved. The assignment can be carried out by means of a classification model which comprises a plurality of classification methods. In particular two event classes are provided for the classification, wherein the first event class is representative of the fact that an accident occurs at a low speed (low speed crash case) and the second event class that no such accident occurs (misuse case which comprises not only misuse events but also other uncritical events such as the normal driving mode). A corresponding signal or at least a corresponding message is then output by the classification unit 8 and can in turn be read in and used by other systems, in particular vehicle systems, and used for other control tasks and/or evaluations, for example for informing a vehicle independent device such as, for example, a smartphone of the holder of the vehicle or for further use within the scope of off board side telematics platforms and telematics services and/or for the entirely or partially automatic determination of the damage caused to the vehicle by the accident.

The succession of method steps for generating, making available, transmitting, processing, inputting and/or outputting signals and/or data is illustrated in FIG. 1, in each case by arrows. Below, there is a somewhat more detailed description of system components and method steps executed therein relating to the signal pre-processing unit 6, the feature computation unit 7 and the classification unit 8.

Signal Pre-processing Unit

In the signal pre-processing unit 6, the sensor signals and/or data received by the CAN databus 4 are first processed by a signal decoder 11 (FIL) which decodes the signals and/or data, in particular if they are encoded as messages, by means of a decoding rule stored, for example, in a vehicle database which contains the corresponding message definitions of the respective communication bus protocol, and said signal decoder 11 (FIL) filters said signals and/or data according to predefined rules. In this context, only selectively predefined signals and/or data are output to a synchronizing unit 12 of the signal pre-processing unit 6, which signals and/or data contribute to the detection of an accident event. Although FIG. 1 only shows a decoding unit 11 which carries out both the decoding and the filtering, two units which are separate from one another can also be provided for these two functions.

If the respective signals or data running via the communication bus, here the CAN databus 4, are propagated by means of message transmission or data transmission which is asynchronous or "quasi asynchronous" (in terms of the useful signals contained therein, for example despite a synchronous bus clock), the previously decoded and filtered individual signals and data items are synchronized in the synchronizing unit 12 (SYN). The signals and/or data items can additionally be adjusted to a common sampling frequency for the following further processing by a corresponding sampling rate conversion or corresponding resampling. The signals and/or data items which have been adjusted to a common sampling frequency are fed to a signal windowing unit 13 (WIN) of the signal pre-processing unit 6 in which they run through a process for sliding chronological signal window formation.

In this context, the signals and/or data items which are synchronized with one another are logically assigned to one another for, in each case, one predefined time window, and in particular, combined to form one data set. Respective time windows are defined by means of adjustable and previously set parameters, in particular by means of a parameter for a window width (duration of the time interval of a window or corresponding number of samples (sampled values), window size or window length) a parameter for an overlap factor (for the chronological overlap between adjacent signal windows (shifting during the sliding windowing/window formation) and/or a parameter for the use of one or more predefined window functions, for example, Hamming, Von Hann (Hanning or Raised Cosine), Blackman or Kaiser. For a window function it is also possible, where appropriate, to set their parameters before their use. In a "trivial" setting, a rectangular window (signal values within the window are adopted in an unchanged form) and an overlap factor of 0% (no overlap or sliding window is shifted in each case by one full window length) would be set, for example, as a window function.

The respective signal profiles (signal samples) are preferably buffered in accordance with the set window width and/or the set overlap factor in a memory. As a result, signals or data which are required jointly for the feature computation which takes place later can be made available reliably even when the signal profiles arrive individually in the signal pre-processing unit 6 at the runtime.

Feature Computation Unit

A multi-dimensional feature vector is computed in the feature computation unit 7 from the relevant partial signals formed previously by means of the synchronous signal windows and/or by means of the corresponding data. In this context, it is possible to form individual partial components of a feature vector from individual features which are each computed within correspondingly dedicated sub-feature computation units 15. In this context, it is also possible for a sub-feature computation unit 15 to compute, if appropriate, a plurality of partial components of the feature vector or a plurality of features.

The core of the feature computation unit 7 is formed by a plurality of sub feature computation units 15 (FC1 . . . FCn), which each compute, by means of predefined rules, feature data which is in each case assigned either to a plurality or to precisely one specific feature.

The feature computation unit 7 optionally has on the input side, or connected upstream of the sub feature computation units 15, a pre-processing unit 14 to which the signals, data, partial signals or basic signals and/or data components, formed previously by the signal windowing unit 13 of the signal pre-processing unit 6, are fed, and in which signal pre-processing unit they can optionally be pre-processed in such a way that operations which are required repeatedly for the subsequent computation of predefined feature data or features assigned thereto, in particular for a plurality of feature data items or features and/or sub feature vectors, are already executed in at least one corresponding pre-processing step, with the result that the respective events can be used directly in the later steps for forming the feature data or features and/or sub feature vectors. As a result, it is possible to avoid redundancy during the computation and therefore optimize the computational power. This is advantageous, in particular, in order to configure the detection system 2 in a real time capable fashion.

In the feature computation unit 7 it is optionally possible to provide on the output side, in particular connected downstream of the sub feature computation units 15, a post processing unit 16 (POST) with which the previously computed feature data or features, in particular sub feature vectors are post processed individually or in groups and/or the resulting entire feature vector (also referenced within the scope of the invention as an observation feature vector) is post processed, with predefined rules. For example, in this context vector quantization could finally be used on an originally computed feature vector and/or the observation feature vector. The data, formed from the individual feature/ sub feature vectors, of the observation feature vector is stored in a register memory 17. The data stored in predefined register cells of the register memory 17 in turn represents individually computed features.

The feature computation unit 7 outputs, per combined signal window block which is present on the input side, a resulting, multi-dimensional observation feature vector which, depending on the setting or parameterization of the feature computation unit 7, has, in particular, at least two dimensions and/or at least two computed features as vector components. The output frequency is analogous or dependent on the corresponding windowing parameters such as the sampling rate of the windowed sample, window width and/or overlap factor.

The observation feature vector is fed to the classification unit 8 for further signal processing or data processing for the purpose of classification of the underlying physical event which is indirectly observed, if appropriate, via the previously described process steps (which event can also be non-critical).

Classification Unit

In the classification unit 8, a decision regarding the membership of one of the previously defined event classes is made on the basis of the feature signals or feature data fed thereto, combined by means of the observation feature vector. For this purpose, the respective signals or data are firstly processed in accordance with the setting or parameterization of the classification unit 8 on the basis of the classification methods learned by the respective machine learning method, in at least one of the classification processors 18*a*, 18*b*, 18*c*, wherein 18*a* shows a classification processor with implementation according to a Hidden Markov Model (HMM) method, the classification processor 18*b* with implementation according to a support vector machine (SVM) method and 18*c* the classification processor with implementation according to a method on the basis of an artificial neural network (ANN). Corresponding open loop and/or loop control data, associated with the respective methods and/or classification models, are stored in the classification database 9. Training feature data can also be stored in the classification database 9. The respective implementation for the specified machine learning methods for use of the classification method comprises at least one rule, in particular a plurality of rules, such as assignment rules, comparison rules and/or computational rules. The implementation can take place, in particular, in a computer program.

The Hidden Markov Model (HMM) is a stochastic model in which a system is modeled by a Markov Chain, named after the Russian mathematician Andrej Andreevič Markov, with unobserved states. The modeling as a Markov Chain means that the system changes randomly from one state into another, wherein the transition probabilities respectively depend only on the current state but not on the state previously assumed. Furthermore, it is assumed here that the transition probabilities are constant over time. However, in the case of an HMM these states themselves are not observed from the outside. They are hidden. Instead, each of these inner states is assigned observable output symbols, referred to as emissions, which occur with certain probabilities depending on the state. The output consists usually in arriving at statements relating to probability theory about the hidden states on the basis of the observed sequence of emissions. An HMM can be considered to be a special case of a dynamic Bayesian network.

A support vector machine (SVM) divides a quantity of objects into classes in such a way that the class boundaries remain free of objects around a range which is as broad as possible; said machine is what is referred to as a large margin classifier (in German "Breiter Rand Klassifikator"). The initial basis for the construction of a support vector machine is a quantity of training objects, for which the class to which each belongs is respectively known. Each object is represented by a vector in an N dimensional vector space. The task of the support vector machine is to fit a hyperplane of the dimension N 1 into this space, said hyperplane functioning as a separation plane and dividing the training objects into two classes. The distance between such vectors, which lie closest to the hyperplane, is maximized here. This broad empty edge is intended to ensure later that even objects which do not correspond precisely to the training objects are classified as reliably as possible.

When the hyperplane is used it is not necessary to observe all the training vectors. Vectors which are further away from the hyperplane and are to a certain extent "hidden" behind a front of other vectors do not influence the orientation and position of the separation plane. The hyperplane is dependent only on the vectors lying closest to it—and also requires only these vectors to describe the plane in a mathematically precise fashion. These closest vectors are referred to, according to their function, as support vectors.

A hyperplane cannot be "hidden," with the result that a clean separation with a hyperplane is possible only when the objects are linearly separable. This is generally not the case in real applications.

Other or further classification processors according to other classification methods can also be used, for example based on decision trees or on some other dynamic Bayesian network.

On the basis of the results of the processing in the at least one classification processor 18a, 18b and 18c, the decision is then made in the class decision unit 19 as to which event class the event which underlies the processed data or is observed is assigned. In this context, it is possible, for example, to optionally examine statistically the results of the respective events which are output by the various classification processors 18a, 18b and 18c, in order to form an overall result. The event classes can be defined, for example in a binary fashion as a class label of the event class "misuse" (or no accident/critical event) with the class index zero as well as a class label of the event class "Low Speed Crash" with the class index one. The class decision unit 19 or the classification unit 8 correspondingly outputs, via an interface 20 (IF) as a result the class index of the event class which is assigned on the basis of the respective classification method or methods, and is in particular the most probable one, for the underlying event. Insofar as said event supports the selected classification method and/or the class decision unit 19 on the output side it is additionally or alternatively also possible to determine or, if appropriate, output the class probability of the currently evaluated feature vector.

The respective detection and processing of signals, data and/or messages and, in particular, the classification method is carried out continuously at the runtime (during the driving operation of the vehicle, in the "emission on" state and/or, if appropriate, in a corresponding standby operation of the vehicle), even if no critical event is occurring, in order to be able to detect a critical event in near to real time conditions. As a rule, a classification of the result "no accident" is accordingly output continuously.

Figure 2:
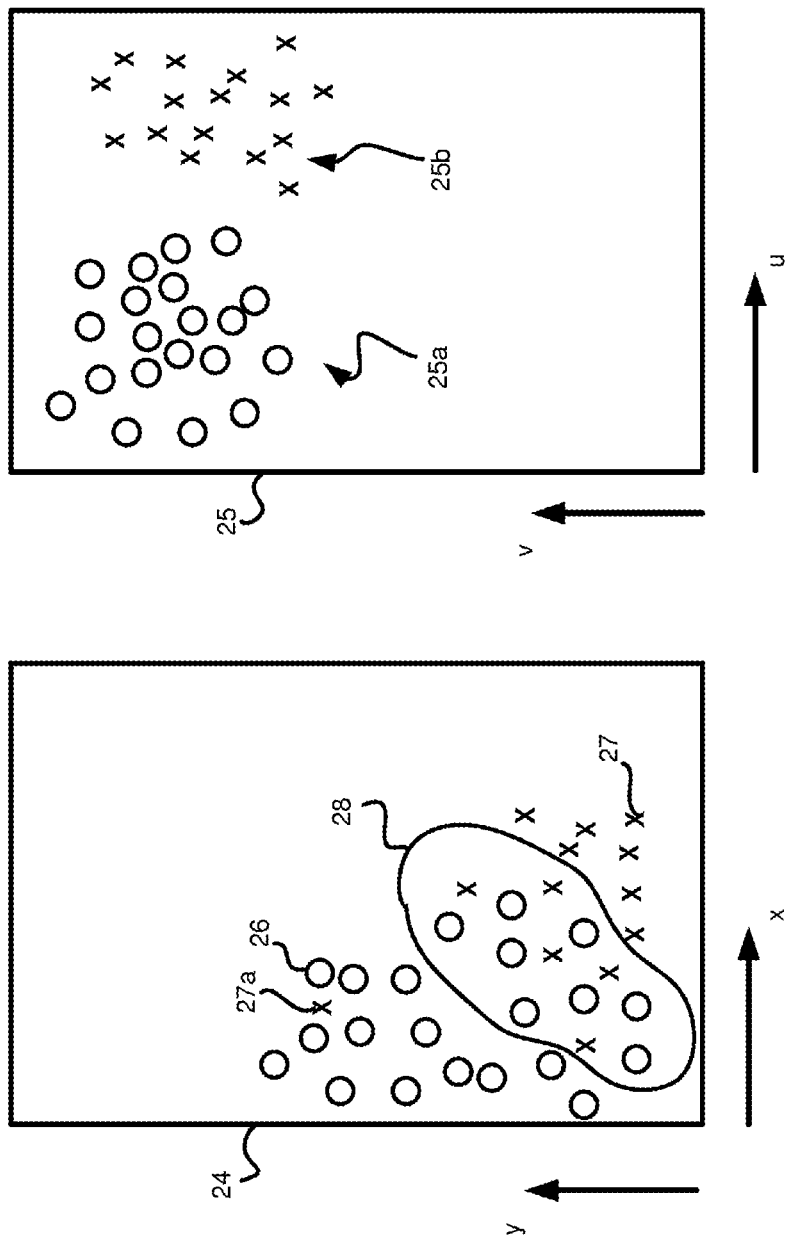
FIG. 2 shows feature spaces for low speed crash events.

FIG. 2 shows two feature spaces 24, 25 for representative impact events and, in particular, limit value misuse events between a vehicle and an object. Those feature data items which correspond to a low speed crash event are respectively illustrated with circles 26, and those feature data items which correspond to a misuse event are illustrated with crosses 27.

In the feature space 24, the respective initial speeds of the vehicle are specified in the x axis direction, and the absolute value of the respective maximum acceleration of an acceleration sensor of the vehicle, which occurs during the impact event, is specified in the y axis direction.

As can be seen in FIG. 2, in the feature space 24 the low speed crash events are not clearly delineated from the misuse events, in particular in the overlap region 28 and, e.g., for the event symbolized by cross 27a. FIG. 2 thus shows, on the one hand, that it is virtually impossible to assign the respective type of event (low speed crash versus misuse) correctly on the basis of the respective feature data of the feature space 24 (or of the aggregated movement variables "initial speed" and "acceleration value" illustrated therein) or to detect if the type of event is not known in advance. On the other hand, FIG. 2 shows that such an assignment or detection can be carried out much more precisely by means of the data of the feature space 25, which is apparent from the clearer separation between the two areas 25a and 25b. The feature space 25 is a feature space which is more advantageous for the detection of events. The derived features which are illustrated on the respective axes u and v of the feature space 25 each correspond to one or more features which are computed by means of the sub feature computation units 15 (FC1 . . . FCn) shown in FIG. 1, wherein the underlying features are determined differently than the features of the feature space 24. In particular, these can be determined on the basis of relatively complex data and/or data processing steps, e.g. also on the basis of various types of data, for example with respect to various movement variables and/or with respect to other variables such as acoustic and/or optical variables. As a result of the clearer separation of the areas 25a and 25b it is advantageously possible to carry out a more precise automatic assignment of the respective data of an event to one of the two event classifications (Low Speed Crash Event versus Misuse Event).

Figure 3:
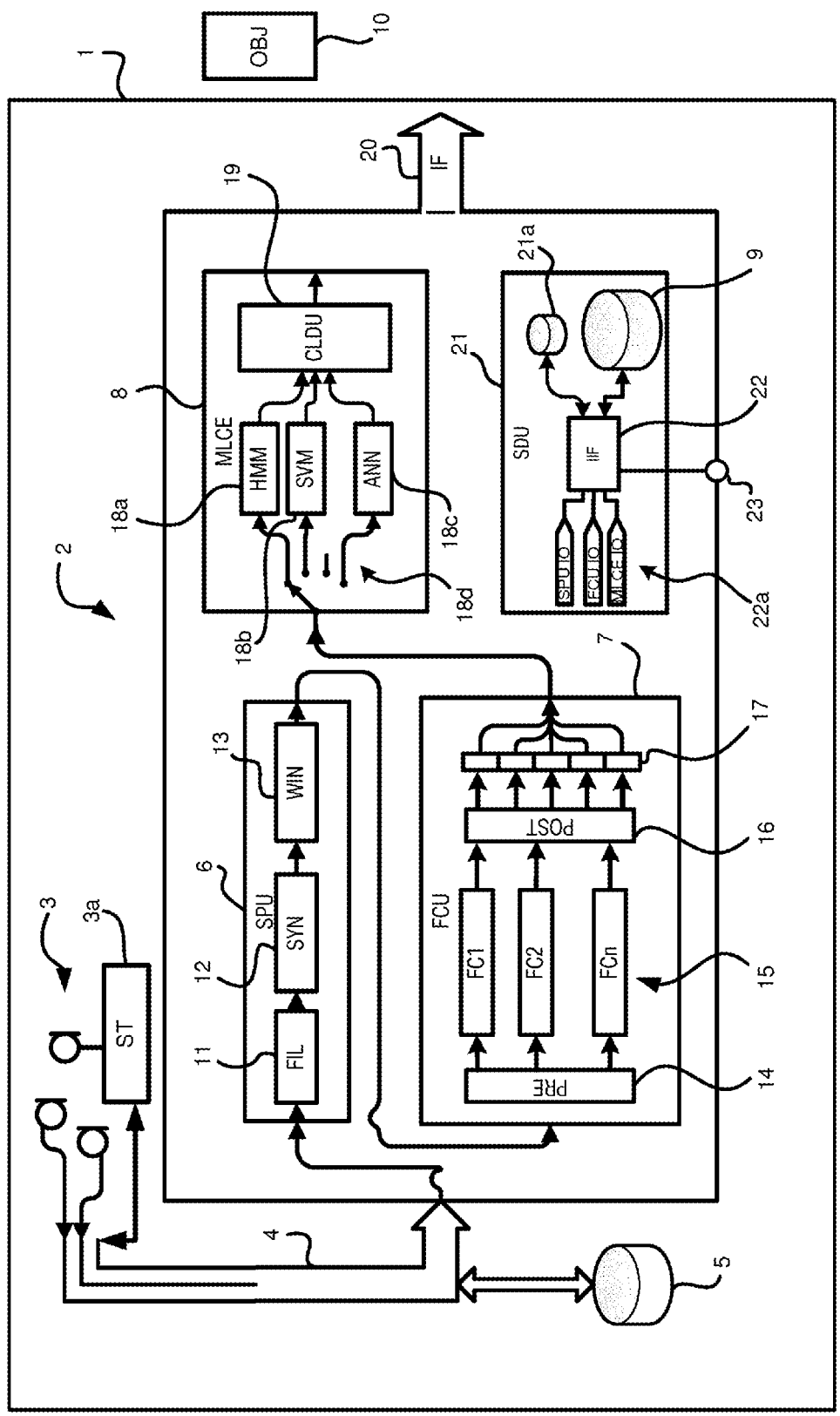
FIG. 3 shows a system corresponding to the system in FIG. 1 with a learning mode.

FIG. 3 shows the detection system 2 shown in FIG. 1, wherein here, inter alia, system components are illustrated which are provided for training the classification unit 8 within the scope of the machine learning process.

The detection system 2 can be described in at least two operating states, specifically, on the one hand, in a training operating state (training mode) in which features, in particular parameters and/or rules for the classification unit 8 are determined on the basis of a machine learning process and, on the other hand, in a productive operating state, referred to "run mode," in which a decision about the occurrence of a low speed crash is actually made of the basis of the data acquired by sensors in a vehicle, in particular online at the runtime and/or in real time. With respect to FIG. 1, the "run mode" has already been described above with reference to the system components [mainly] shown there.

The system data unit (SDU) 21, also referred to as a system data module, serves for the central storage of system relevant data which essentially comprises the system configuration or system parameterization as well as the data which is stored in the classification database 9 and is generated and stored, in particular, in the course of the machine learning process.

In the classification unit 8, logic switching is then carried out by means of a logical classification selection switch 18d or a corresponding selection means, to determine which of the respective classification processors 18a . . . 18c is to be trained or respectively used. A corresponding selection of one or more classification processors can also take place in the "run mode" with the result that the corresponding feature signals or feature data to be processed run through one or more classification processors in a parallel or serial fashion.

Both data of the system configuration and data for controlling reading and/or writing access to the classification database 9 is made available to the respective system components of the detection system 2, in particular to the classification unit 8, via an internal data interface 22 (BF). For this purpose, respectively corresponding dedicated input ports and/or output ports 22a are provided for the signal processing unit 6 (SPU JO), for the feature computation unit 7 (FCU JO) and for the classification unit (MLCE JO).

Via the external interface 23 it is also possible to perform system configurations from the outside and/or interrogate information relating to the current status of the detection system 2. Configuration data (parameters) are stored in a configuration data memory 21a.

Although the detection system 2 which is shown in FIG. 3 has the two operating modes "training" and "productive operation" (run), it is possible to provide a corresponding detection system 2 which has in this respect only the operating state "run" and is filled in advance with control data, in particular classification data, classification rules and/or classification models which are generated or learnt previously in another system, in particular reference system, in particular on the basis of a machine learning process, referred to as supervised learning. Such a system then, has, in particular, the system components which are shown in FIG. 1.

In the "training" operating mode, two subordinate learning modes can in turn be provided. In a first "train features" learning mode, the detection system 2 carries out the signal pre-processing and the feature computation and stores the respectively corresponding computed feature vector, in particular in the classification database 9, for each signal time window [block] which is formed. In a second "train model" learning mode, firstly data, rules and/or models are predefined manually.

Respective measurement data and/or data derived therefrom are in particular assigned manually the respective event on which they are based, referred to as labeling. In this context, in particular the event classes (class 0 "misuse" and class 1 "low speed crash") which are assigned are respectively correspondingly associated with the previously formed time windows and/or the previously computed feature vectors by a domain expert and are stored permanently within the training database 9. The actual machine learning classification model can then be trained. The resulting trained classification model, whose specific embodiment can be formed differently depending on the selected machine learning method, is also permanently stored in the classification database 9. Said classification model is then used, where appropriate, in the run operating state by the corresponding machine learning classification method for classifying the feature data or feature vectors or the observation feature vector to be respectively assessed.

With respect to the training of the artificial neural network (ANN) as described with respect to FIG. 3, various methods can be used alone or in combination, in particular what is referred to as monitored learning, reinforced learning, non-monitored learning and stochastic learning.

During the monitored learning, an input pattern is fed to the ANN, and the output which produces the neural network in its current state is compared with the value which it actually is to output. By comparing the target output and the actual output it is possible to infer the changes which are to be performed in the network configuration.

During reinforced learning, an agent determines the benefit of action sequences in a world. For this purpose, reinforced learning uses, in particular, the theory of the Markov Decision Problems (Markov Decision Processes, MDP). This is based on the approach of distributing rewards, which are given to an agent, with respect to the preceding actions in such a way that the agent knows and can utilize the benefit of each action.

The non-monitored learning takes place, in particular, exclusively by inputting the patterns to be learned. The artificial neural network changes automatically in accordance with the input patterns.

In the case of stochastic learning, a learning algorithm attempts to find a hypothesis which makes predictions which are as well targeted as possible. The term hypothesis is to be understood here as meaning a mapping or rule which assigns the assumed output value to each input value. For this purpose, the algorithm changes the free parameters of the selected hypothesis class. The set of all the hypotheses which can be modeled by a specific artificial neural network is often used as a hypothesis class. In this case, the freely selectable parameters are the weights w of the neurons.

With respect to FIGS. 1 and 3 it is possible to state in summarizing fashion that the described detection system 2 has three main system components or signal processing steps with respect to the signal processing chain, specifically
 a signal pre-processing unit or stage,
 a feature computation unit or stage, and
 a classification unit or stage.

Furthermore, the respective system 2 can preferably have a system data module which is configured to make available storage space for required system data such as, for example, for system configuration, system parameterization and/or a machine learning training database which contains training data for a machine learning process. Furthermore, it is possible to provide that the system data module makes available at least one system internal and/or external interface for the input data access and/or output data access.

Figure 4:
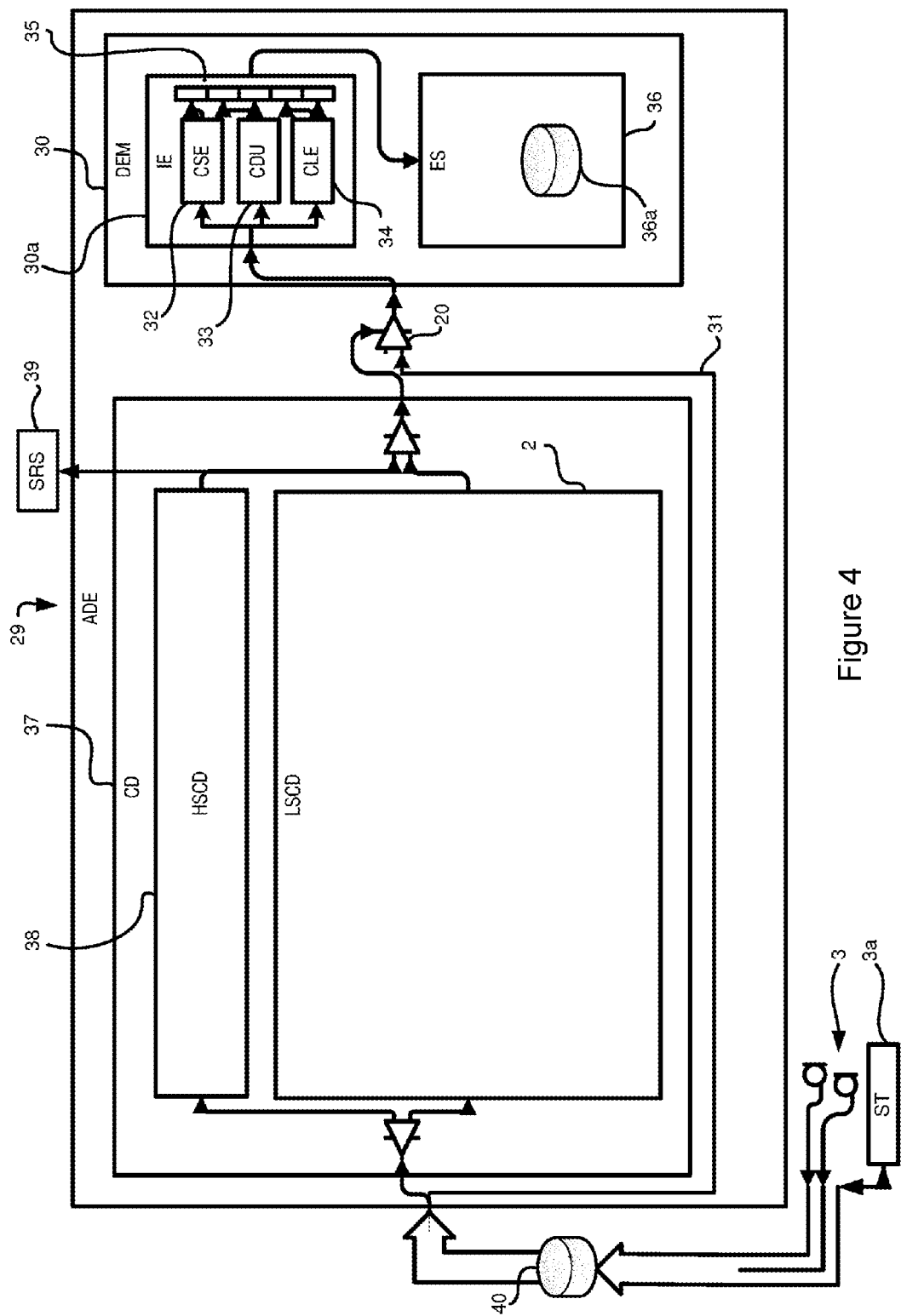
FIG. 4 shows a damage detection system for a vehicle and FIG. 5 shows a vehicle having a sensor system.

FIG. 4 illustrates an automated damage detection system 29 (Automated Damage Estimation System, ADE) for a vehicle with which after an impact event it is possible to decide automatically whether the event is a low speed crash and, under certain circumstances, the scope of the damage which has possibly occurred here can be determined and/or evaluated in an automated fashion.

The damage detection system 29 comprises an accident detection system 37 (Crash Detection System, CD) and a damage determining module 30 (Damage Estimation Module, DEM). The accident detection system 37 comprises, in particular, in turn two sub systems which evaluate data made available by means of vehicle sensors, as accident data essentially independently and, in particular on the basis of various algorithms. The respective data which is to be evaluated and/or algorithms can be at least partially the same for both sub systems.

The first sub system is specialized in detecting low speed crash events (Low Speed Crash Detection, LSCD), and the second sub system is specialized in detecting serious accident events, with the result that, for example, an active vehicle occupant protection system is activated on the vehicle. The first sub system is embodied essentially according to the detection system 2, and, in particular, according to one of the detection systems described in FIGS. 1 and 3, for corresponding classification of the impact event.

The second sub-system 38 is an accident detection module which detects serious accidents at relatively high relative speeds between the vehicle and impacting object (High Speed Crash Detection System (HSCDS)), in particular on the basis of sensors, signal processing methods and data processing methods and control units for a safety restraint system (SRS), with the result that at least one active vehicle occupant protection system 39 can be activated, for example an airbag. For this purpose, this system 38 can also receive input data from sensors 3, control units 3a, a communication bus and/or vehicle internal databases such as an accident database 40.

The signals and/or data which are output by the detection system 2 and the accident detection module 38 are output via a common interface 20. The information which is made available by the interface 20 and relates to the event class which is assigned to the impact event by the detection system 2 and/or information which is made available by the accident detection system 37, in particular the respective class label or class indexes, is output to a damage determining module 30 (Damage Estimation Module, DEM).

Furthermore, data and/or signals which are made available by the sensors 3, further sensors and/or control units 3a of the vehicle are fed to the damage determining module 30 via the crash data path 31, said data and/or signals having been generated, in particular, before, during and/or after the impact event by said sensors, further sensors and control units 3a. In this context, in particular data and/or signals can be provided which indicate accelerations, indicate deformations on vehicle components and/or indicate other mechanical and/or electrical defects of the vehicle. The data can also comprise, in particular, image data or image signals which have been generated with a camera of the vehicle. The respective data can be stored, in particular, in a volatile data memory and/or in a non-volatile data memory, in particular in the accident database 39 of the vehicle.

In the damage determining module 30, the signals and/or data which are fed thereto are processed and, in particular, evaluated to determine whether at least one damage feature value, in particular a damage feature vector is output by an impact assessment module 30a which assesses the impact (impact estimation, IE). For this purpose, a plurality of data processing units is provided in the damage determining module 30. A corresponding impact severity determining module 30 comprises a crash severity determining unit 32 (CSE) which determines and outputs a value of the severity of the impact on the basis of predefined rules, a crash direction determining unit 33 (crash direction unit, CDU) which determines and outputs a value for the impact direction in relation to vehicle axes on the basis of predefined rules, a crash location determining unit 34 (CLE) which determines and outputs the location of the impact with the vehicle on the basis of predefined rules, and/or a vector processing unit 35 which computes the damage feature vector on the basis of predefined rules, from the values which have been output by the units 32, 33 and 34. This vector can then be output to an expert system 36 (ES) which in turn comprises a corresponding database 36a, for more precise determination of the damage possibly caused to the vehicle during the impact, on the basis of predefined rules and data of the database 36a.

In so far as this document refers to predefined rules, such rules, in particular parameters of the rules, are adjustable.

The accident damage detection system 29 can be provided entirely in the vehicle or partially in the vehicle (in particular with respect to the accident detection system 37 or its sub systems 2, 38) and partially in a device, comprising, in particular, a computer, outside the vehicle, in particular with respect to the damage determining system 30 and its respective components.

Although the accident damage detection system 29 has been described with two sub systems, specifically the low speed crash detection system 2 and the high speed crash detection system 38, in order to output a trigger for triggering the damage detection module 30, it is also possible in each case for said accident damage detection system 29 to be constructed only on the basis of one of these sub systems.

Figure 5:
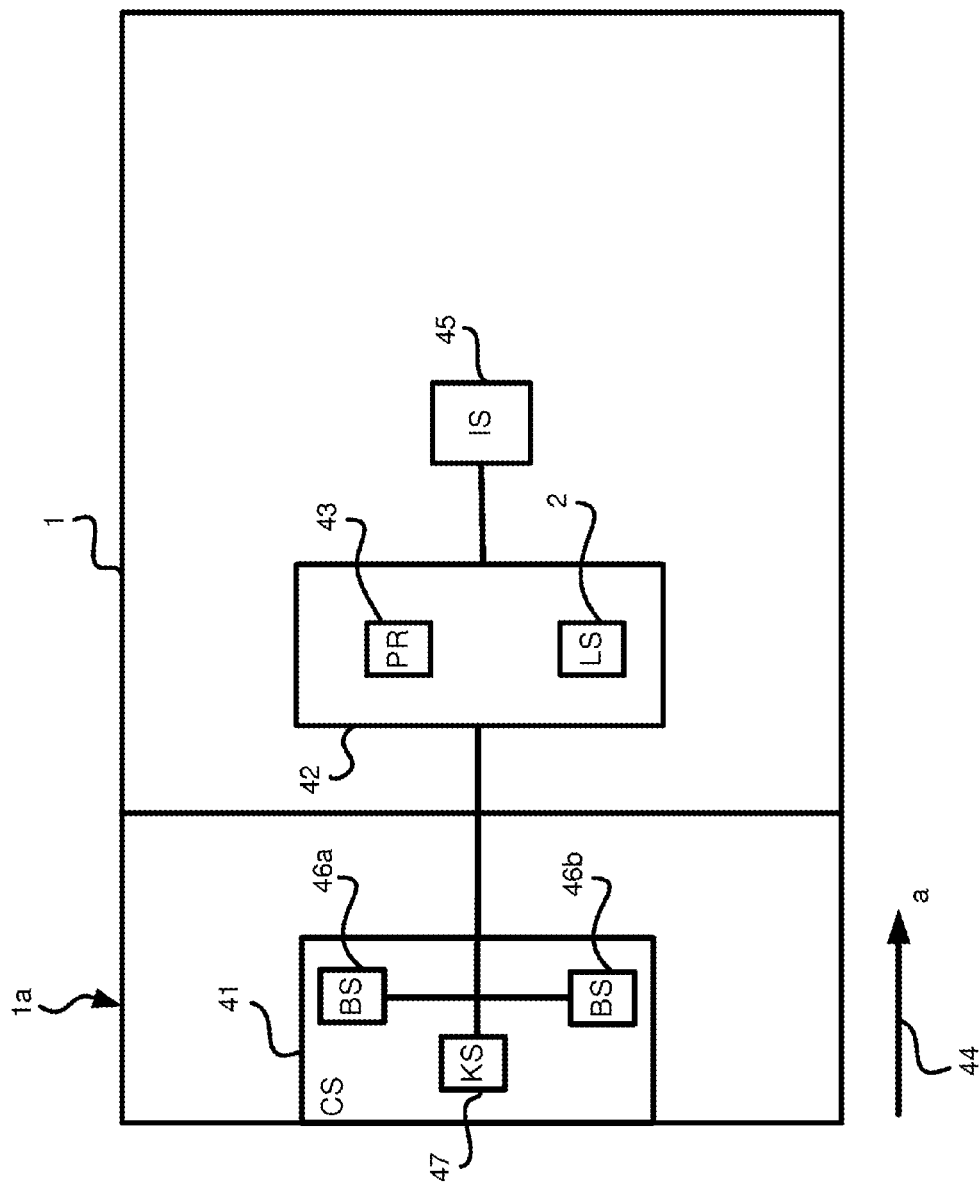

In the vehicle 1 illustrated in FIG. 5, a crash sensor system (CS) 41, by means of which at least one accident relevant movement variable can be detected in a direction a illustrated with the arrow 44, is provided in the front region 1a of said vehicle 1. One or more sensor values, in particular at least one corresponding acceleration value, are processed in an electronic controller 42 by means of a signal processor 42. When at least a first threshold value is exceeded or undershot, a corresponding signal is output to an active vehicle occupant protection system (IS) 45 for actuating the actuators thereof, which signal triggers the units thereof, such as the airbag, seatbelt pretensioner, etc. A movement variable value which is detected by the crash sensor system 41 is additionally output to the low speed crash detection unit (LS) 2 which has already been described above and by means of which a low speed crash event is detected.

The crash sensor system 41 comprises two acceleration sensors (BS) 46a, 46 as well as a force sensor (KS) 47, which can also be embodied as a pressure sensor. The respective sensors can detect corresponding movement variables, wherein the force sensor 47 can detect a quasi-static acceleration. The respective sensor signals are fed to the electronic controller 42 for processing in the processor 43. The vehicle 1 can also comprise further components, which have already been described in relation to FIGS. 1 to 4.

It has been specified further above that with the described methods and systems a low speed crash event can be detected automatically with a high level of reliability, the corresponding data can be stored for documentation purposes in the vehicle and/or transmitted to a vehicle external memory. Furthermore, there can also be provision for example, that the vehicle user and/or vehicle keeper is informed automatically by means of a mobile radio device provided in his vehicle, using a messaging system such as, for example, a short message service (SMS), if the vehicle experiences an impact in the parked state. There can also be provision that one or more further systems are activated in the vehicle in reaction to the collision, e.g., the horn in order, if appropriate, to inform the other vehicle driver that the vehicle has been damaged, or a camera which documents the damage to the vehicle.

The described devices and system components are controlled, in particular, with computer programs and can for this purpose have further elements of computers and digital control devices which are known per se, such as a microprocessor, volatile and non-volatile memories, interfaces etc. The invention can therefore also be implemented entirely or partially in the form of a computer program product which, when loaded and run on a computer, entirely or partially brings about a sequence according to the invention. Said product can be made available, for example, in the form of a data carrier such as a CD/DVD, or else in the form of one or more files on a server, from which the computer program can be downloaded.

LIST OF REFERENCE NUMBERS

1 Vehicle
1a Front region
2 Detection system
3 Sensors
3a Control unit
4 CAN bus
5 Trace memory
6 Signal processing unit
7 Feature computation unit
8 Classification unit
9 Classification database
10 Object
11 Signal decoder
12 Synchronization unit
13 Signal window unit
14 Pre-processing unit
15 Sub feature computation unit
16 Post processing unit
17 Vector processing unit
18a . . . 18c Classification processor
19 Class decision unit
20 Interface
21 System data module
21a Configuration data memory
22 Internal interface
23 External interface
24 Feature space before processing
25 Feature space after processing
26 Low speed crash feature data
27 Misuse feature data
28 Overlap region
29 Damage detection system
30 Damage determining module
30a Impact assessment module
31 Crash data path
32 Crash severity detection unit
33 Crash direction detection unit
34 Crash location determining unit
35 Vector processing unit
36 Expert system
36a Database
37 Accident detection system
38 Accident detection module
39 Vehicle occupant protection system
40 Accident database
41 Crash sensor system
42 Control unit
43 Processor
44 Acceleration direction
45 Active vehicle occupant protection system
46a, 46b Acceleration sensor
47 Pressure sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting an impact event in which a vehicle and an object impact against one another, the method comprising:
determining whether an ignition of the vehicle is switched on, and when the ignition is switched off waking up the vehicle from a sleeping state to carry out impact detection;
determining, based on a movement variable that is used for controlling activation of at least one active vehicle occupant protection system of the vehicle provided for accidents, that the impact is so low that the at least one vehicle occupant protection system of the vehicle is not activated by the impact event;
filtering at least one of signals and data received from sensors of the vehicle;
forming feature data based on at least one of filtered signals and filtered data;
determining if the impact event is a low speed crash, and determining if the impact event is a misuse event, in which a crash has not occurred, based on the feature data; and
classifying the impact event in a classification database as the low speed crash when the impact event is determined to be the low speed crash and classifying the impact event as the misuse event when the impact event is determined to be the misuse event based on the feature data.

2. The method as claimed in claim 1, wherein the at least one of the signals and data are temporally synchronized with one another for the filtering.

3. The method as claimed in claim 2, wherein during the filtering, at least one of selection signals and selection data predetermined by predefined time window data are selected or derived from the at least one of the signals and data received from the sensors.

4. The method as claimed in claim 2, wherein vector data are formed as feature vectors from a plurality of the feature data.

5. The method as claimed in claim 2, wherein the classifying is performed based on an artificial neural network, support vector machines, a Hidden Markov Model, or decision trees.

6. The method as claimed in claim 2, wherein at least one of the at least one of the signals and data received from the sensors, at least one of signals and data derived therefrom, and at least one of signals and data formed by control units of the vehicle are transmitted via a databus of the vehicle.

7. The method as claimed claim 2, wherein the movement variable which is assigned to the impact is provided with at least one of an impact speed, a change in speed, and a change in acceleration of the vehicle, which are associated with at least one of the impact and an energy variable assigned to the impact.

8. The method as claimed in claim 1, wherein during the filtering, at least one of selection signals and selection data predetermined by predefined time window data are selected or derived from the at least one of the signals and data received from the sensors.

9. The method as claimed in claim 1, wherein vector data are formed as feature vectors from a plurality of the feature data.

10. The method as claimed in claim 1, wherein the classifying is performed based on an artificial neural network, support vector machines, a Hidden Markov Model, or decision trees.

11. The method as claimed in claim 1, wherein at least one of the at least one of the signals and data received from the sensors, at least one of signals and data derived therefrom, and at least one of signals and data formed by control units of the vehicle are transmitted via a databus of the vehicle.

12. The method as claimed claim 1, wherein the movement variable which is assigned to the impact is provided with at least one of an impact speed, a change in speed, and a change in acceleration of the vehicle, which are associated with at least one of the impact and an energy variable assigned to the impact.

13. A method for determining damage occurring to a vehicle due to an impact event, the method comprising:
  determining whether an ignition of the vehicle is switched on, and when the ignition is switched off waking up the vehicle from a sleeping state to carry out impact detection;
  determining, based on a movement variable that is used for controlling activation of at least one active vehicle occupant protection system of the vehicle provided for accidents, that the impact is so low that the at least one vehicle occupant protection system of the vehicle is not activated by the impact event;
  filtering at least one of signals and data received from sensors of the vehicle;
  forming feature data based on at least one of filtered signals and filtered data;
  determining if the impact event is a low speed crash, and determining if the impact event is a misuse event, in which a crash has not occurred, based on the feature data;
  classifying the impact event in a classification database as the low speed crash when the impact event is determined to be the low speed crash and classifying the impact event as the misuse event when the impact event is determined to be the misuse event based on the feature data;
  determining accident data based on a classification of the classified impact event; and
  determining a scope of the damage to the vehicle based on the determined accident data.

14. The method as claimed in claim 13, wherein the at least one of the signals and data are temporally synchronized with one another for the filtering.

15. The method as claimed in claim 13, wherein during the filtering, at least one of selection signals and selection data predetermined by predefined time window data are selected or derived from the at least one of the signals and data received from the sensors.

16. The method as claimed in claim 13, whrein wherein vector data are formed as feature vectors from a plurality of the feature data.

17. A system for detecting a vehicle accident in which a vehicle and an object impact against one another, wherein a movement variable which is assigned to the impact is so low that at least one active vehicle occupant protection system of the vehicle, provided for accidents, is not activated by the impact event, the system comprising:
  a control unit configure to determine whether an ignition of the vehicle is switched on, and when the ignition is switched off to wake up the vehicle from a sleeping state to carry out impact detection;
  sensors, provided for the vehicle, that output at least one of signals and data relating to the impact event; and
  a data-processing device, including a classification database, configured to process the at least one of the signals and data in such a way that the at least one of the signals and data are filtered, feature data is formed based on the at least one of filtered signals and data, a first determination is made whether the impact event is a low speed crash based on the feature data, a second determination is made whether the impact event is a misuse event, in which a crash has not occurred, based on the feature data, and the impact event is classified in the classification database as the low speed crash when the impact event is determined to be the low speed crash and classified as the misuse event when the impact event is determined to be the misuse event, based on the feature data.

18. A vehicle comprising a system as claimed in claim 17.

19. A damage-detection system for determining damage occurring to a vehicle due to an impact event, in which the vehicle and an object impact against one another, wherein a movement variable which is assigned to the impact is so low that at least one active vehicle occupant protection system of the vehicle, provided for accidents, is not activated by the impact event, the system comprising:
  a control unit configure to determine whether an ignition of the vehicle is switched on, and when the ignition is switched off to wake up the vehicle from a sleeping state to carry out impact detection;
  sensors, provided for the vehicle, that output at least one of signals and data relating to the impact event; and
  a data-processing device, including a classification database, configured to process the at least one of the signals and data in such a way that the at least one of the signals and data are filtered, feature data is formed based on the at least one of filtered signals and data, a first determination is made whether the impact event is a low speed crash based on the feature data, a second determination is made whether the impact event is a misuse event, in which a crash has not occurred, based on the feature data, the impact event is classified in the classification database as the low speed crash when the impact event is determined to be the low speed crash and classified as the misuse event when the impact event is determined to be the misuse event, based on the feature data, accident data is determined based on a classification of the impact event, and a scope of the damage to the vehicle is determined based on the determined accident data.

20. A non-transitory computer-readable medium storing a program, which when executed on a computer, detects an impact event in which a vehicle and an object impact against one another, the program executing steps comprising:
  determining whether an ignition of the vehicle is switched on, and when the ignition is switched off waking up the vehicle from a sleeping state to carry out impact detection;

determining, based on a movement variable that is used for controlling activation of at least one active vehicle occupant protection system of the vehicle provided for accidents, that the impact is so low that the at least one vehicle occupant protection system of the vehicle is not activated by the impact event;

filtering at least one of signals and data received from sensors of the vehicle;

forming feature data based on at least one of filtered signals and filtered data;

determining if the impact event is a low speed crash, and determining if the impact event is a misuse event, in which a crash has not occurred, based on the feature data; and classifying the impact event in a classification database as the low speed crash when the impact event is determined to be the low speed crash and classifying the impact event as the misuse event when the impact event is determined to be the misuse event based on the feature data.

* * * * *